United States Patent Office 2,902,507
Patented Sept. 1, 1959

2,902,507

METHOD OF SEPARATING ORGANOSILICON COMPOUNDS

James F. Hyde, Midland, and Paul L. Brown, Saginaw, Mich., assignors to Dow Corning Corporation, Midland, Mich., a corporation of Michigan No Drawing. Application October 12, 1956
Serial No. 615,470

4 Claims. (Cl. 260—448.2)

This invention relates to a method of separating and purifying triorgano- and diorganosilicon compounds and of converting siloxanes into chlorosilanes.

In the past several chemical methods have devised for purifying organosiloxanes or organochlorosilanes. Previously the separation of copolymeric organosiloxanes into their various components has involved the use of alkaline reagents. Whereas this method is quite satisfactory for the separation of siloxanes, it is not satisfactory for the separation of chlorosilanes.

Another approach which has been devised employs the selective reaction of a reagent with tetrahalo- and trihalosilanes in preference to dihalo- and monohalosilanes. The reaction products of the reagent and tetrahalo- and trihalosilanes are then separated from the dihalo- and monohalosilanes. This approach, however, is useless for separating siloxanes.

It is the primary object of this invention to provide a method of separating and purifying organosilicon compounds which is equally applicable to organosilanes and organosiloxanes. Another object is to provide an economically feasible method for purifying diorganodihalosilanes and diorganosiloxanes. Another object is to provide a method of converting siloxanes into chlorosilanes or low molecular weight chlorosiloxanes which contain only two or three silicon atoms. Other objects and advantages will be apparent from the following description.

This invention relates to a method comprising separating (1) silicon compounds having two and three substituents of the group alkyl and halogenated alkyl radicals of less than 6 carbon atoms and hydrogen atoms, per silicon atom, the remaining valences of the silicon being satisfied by atoms of the group chlorine and ozygen, there being at least one organic radical per silicon, from each other and from (2) silicon compounds other than (1), by contacting mixtures and copolymers of said silicon compounds with an aqueous solution of hydrochloric acid having a concentration of at least 50% by weight HCl based on the weight of the aqueous solution until the hydrolyzable chlorine content of the organosilicon product has reached the desired amount, separating the aqueous phase from the organosilicon phase without appreciably reducing the concentration of the acid in the aqueous phase during separation and thereafter separating the organosilicon components of the reaction.

The essence of the present invention resides in the discovery that when organosilicon compounds are in contact with aqueous HCl having a concentration of 50% or more, the organosilicon components corresponding to (1) supra are reduced to a volatile form whereas the silicon components corresponding to (2) supra remain in a less volatile or a nonvolatile form. Thus, the silicon compounds (1) are readily separable by distillation or by selective absorption or by any other desired method from each other and/or from the silicon compounds (2). Consequently this invention is particularly adaptable to the preparation of pure organochlorosilanes (1) and for the regeneration of organochlorosilanes (1) from siloxane mixtures and copolymers.

The present invention is applicable for the separation of hydrolyzable silanes such as chlorosilanes. It is particularly advantageous in the separation of chlorosilanes which have boiling points so close together that purification by distillation is difficult or impossible. Thus, for example, it is quite difficult to separate mixtures of methyltrichlorosilane and dimethyldichlorosilane by distillation. It is even more difficult to separate trimethylchlorosilane and silicon tetrachloride because they form an azeotrope. However, either of these mixtures is readily separated by the process of this invention. This is true because under the conditions of the present invention the methyltrichlorosilane and silicon tetrachloride are rendered essentially nonvolatile by partial condensation whereas the dimethyldichlorosilane and trimethylchlorosilane remain in a volatile state.

The process of this invention is equally applicable to the separation of siloxane mixtures and copolymers into the triorgano and diorgano fractions. It is also possible by the method of this invention to separate a copolymer of two diorganosiloxanes into their separate fractions. Thus, for example, a copolymer of dimethylsiloxane and diethylsiloxane is readily separable into the dimethyl component and diethyl component. Likewise, a copolymer of trimethylsiloxane and dimethylsiloxane can be separated into the trimethyl component and dimethyl component. Once the various components have been separated they can be reused in any desired manner.

Silicon compounds (1) which can be separated and purified by the method of this invention are any organochlorosilane or organosiloxane in which the organic groups attached to the silicon are lower alkyl radicals such as methyl, ethyl, propyl, butyl and amyl and halogenated lower alkyl radicals such as chloromethyl, tetrafluoroethyl and 4-bromobutyl.

It should be understood that silicon compounds (2) can have any organic group attached to the silicon or they can have no organic groups attached to the silicon. It should also be understood that (2) can have any inorganic group attached to the silicon.

Specific examples of mixtures and copolymers which are separable in this invention are mixtures of trimethylchlorosilane, dimethyldichlorosilane, methyltrichlorosilane and silicon tetrachloride; mixtures of methyldichlorosilane and methyltrichlorosilane; mixtures of 3,3,3-trifluoropropylmethyldichlorosilane and 3,3,3-trifluoropropyltrichlorosilane; mixtures of dimethylsiloxane and monophenylsiloxane; mixtures of tributyl siloxane and monomethylsiloxane and copolymers of triethylsiloxane, dimethylsiloxane and monoethylsiloxane; copolymers of dimethyl and diethylsiloxane; copolymers of trimethylsiloxane and $SiO_2$; copolymers of trifluoropropylmethylsiloxane and trimethylsiloxane and copolymers of amylmethylsiloxane and monoamylsiloxane.

It is essential for the operation of the present invention that the organosilicon materials be kept in contact with aqueous hydrochloric acid having a concentration of at least 50% by weight based on the total weight of the aqueous phase. When the concentration of the acid is below 50% by weight, unsatisfactory separations are obtained. The upper limit of the acid concentration is not critical although some water must be present in the reaction mixture. The concentrations of acid necessary for the present invention are generally obtained by carrying out the reaction under pressure. The precise pressure employed is not critical so long as it is sufficient to give an acid concentration of at least 50%. The pressure during the reaction will vary with the temperature. The pressure required to give any particular acid concentration increases as the temperature increases. The temperature at which the present invention is carried out is not critical so long as the temperature-pressure relationship gives the desired acid concentration. Obviously extremely high temperatures sufficient to cause excessive cleavage of the organic radicals or hydrogen atoms attached to the silicon atoms should be avoided. In general, the reaction of this invention is carried out at a temperature below 100° C., and the preferred range is from 0 to 50° C. It should be understood, of course, that lower temperatures may be employed if desired and that at temperatures below 0° C. the pressure may be diminished accordingly.

In general, the higher the concentration in the aqueous phase for any given siloxane system, the lower will be be the molecular weight of the volatile products. For that reason the distribution of molecular species in the final product can be controlled at will. It is also true that the lower the acid concentration in the aqueous phase the higher will be the molecular weight of the organosilicon reaction components. Thus when the concentration of the reaction drops below 50% most of the organosilicon components are in a nonvolatile state.

For this reason it is desirable that the separation of the aqueous from the organosilicon phase be carried out under conditions which prevent an appreciable reduction of the acid concentration in the aqueous phase during separation of the two phases. This can be accomplished either by a rapid separation of the two phases or my maintaining the HCl pressure in the reactor during separation or by combination of both methods.

The process of this invention can be carried out in any convenient apparatus and with any order of addition of the reactants. When the starting organisilicon materials are chlorosilanes it is necessary that water be added to the reaction mixture. The amount of water employed may be such that the hydrolysis of the chlorosilane will give the desired acid concentration or additional HCl gas may be added to the reaction mixture. When the starting organosilicon material is a siloxane the water may be generated in situ by adding HCl gas to the siloxane. The reaction involved is SiOSi+HCl→SiCl+SiOH 2SiOH→SiOSi+H₂O If desired, however, water may be added to the siloxane reaction mixture in addition to that generated in situ. One of the preferred methods of operating is to add the water in the form of concentrated hydrochloric acid, that is 36% by weight HCl.

During the reaction it is preferable, but not essential, that the reaction mixture be thoroughly agitated. This increases the mixing of the aqueous and the organosilicon phases and thereby speeds up the reaction. The reaction is continued until the hydrolyzable chlorine content of the organosilicon phase has reached the desired value.

The hydrolyzable chlorine content is a measure of the completeness of the interaction between the aqueous HCl and the silicon compounds. Maximum interaction has occurred when the amount of hydrolyzable chlorine in the organosilicon phase has become constant (i.e. when the system is in equilibrium). Thus, the maximum yield of desired product is obtained when the system has reached this state. However, the reaction can be stopped at any desired stage.

In carrying out the reaction of this invention the volume ratio of aqueous phase to organosilicon phase is not critical. A practical operating range has been found to be from 1 to 2 volumes of aqueous phase per volume of organosilicon phase. However, lesser or greater amounts of aqueous phase can be employed if desired.

The method of this invention can be adapted either to a batch process or to a continuous process. In the batch process the system is allowed to come to the desired state preferably to equilibrium, the aqueous phase is then removed from the reaction vessel and the silicon components separated by distillation or other means. The residue from the distillation can be put back in the reaction vessel and the process repeated. The reaction can be carried out continuously by continuously feeding the organosilicon and the aqueous phase into a reaction zone where the desired amount of interaction takes place, continuously removing the two phases from the reaction zone and separating them, continuously separating the volatile components of the organosilicon phase and returning continuously the nonvolatile fraction of the organosilicon phase and the aqueous phase to the reaction zone.

The process of this invention is particularly useful for the preparation of diorganosilicon compounds of sufficient purity to be employed in the preparation of organosilicon rubber polymers. Such polymers should be free of triorgano- and monoorganosilicon components.

The following examples are illustrative only and should not be construed as limiting the invention which is properly delineated in the appended claims.

Example 1

The chlorosilane employed in this example was a mixture of 5% by weight trimethylchlorosilane, 5% by weight of methyltrichlorosilane and 90% by weight of dimethyldichlorosilane.

3600 g. of this chlorosilane mixture were added under pressure to 2200 ml. of 36% aqueous HCl. The hydrolysis of the chlorosilanes developed a pressure of 150 p.s.i. The mixture was thoroughly agitated during hydrolysis and the temperature was maintained at 7° C. Additional HCl gas was added to bring the final pressure to 267 p.s.i. This represents an acid concentration of 62% by weight of the aqueous phase. After 6 hours the agitation was stopped and the aqueous phase was removed from the bottom of the reactor without appreciably changing the acid concentration. The organosilicon product was then removed and separated by distillation. The fractions obtained were as follows:

| Product | Percent by weight based on the total organosilicon product |
|---|---|
| Me₃SiCl | 6.3 |
| Me₂SiCl₂ | 10.9 |
| 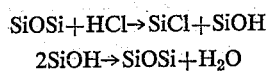 ClSiOSiCl | 33.6 |
| Me₂Me₂ ClSi(OSi)₂Cl | 20.4 |
| Residue | 28.8 |

The residue contained all of the monomethylsilicon component.

Example 2

The process of Example 1 was repeated except that the acid concentration employed was 55.8%. The pressure during the run was 145 p.s.i. The resulting organosilicon product was distilled to obtain the following components.

| Product | Percent by weight based on the total organosilicon product |
|---|---|
| Me₃SiCl | 6.2 |
| Me₂SiCl₂ | 3.1 |
| Me₂Me₂ ClSiOSiCl | 18.2 |
| Me₂Me₂ ClSi(OSi)₂Cl | 20.3 |
| Residue | 52.2 |

The residue contained all of the monomethyl component.

Example 3

The process of Example 1 was repeated except that the temperature during the reaction was 45° C. and the acid concentration was 51.6% by weight of the aqueous phase. The distribution of the components of the organosilicon phase was found to be as follows.

| Product | Percent by weight based on the total organosilicon product |
|---|---|
| $Me_3SiCl$ | 5.2 |
| $Me_2SiCl_2$ | Trace |
| $Me_1Me_2$ $ClSiOSiCl$ | 4.0 |
| $(Me_2SiO)_3$ | .6 |
| A mixture of $(Me_2SiO)_4$ and $Me_2Me_2 ClSi(OSi)_2Cl$ | 6.0 |
| A mixture of $(Me_2SiO)_4$ and $Me_2Me_2 ClSi(OSi)_4Cl$ | 18.5 |
| Residue | 65.7 |

Example 4

2400 ml. of crude ethylmethyldichlorosilane were added under pressure to 1500 ml. of 36% aqueous HCl. The reaction mixture was agitated and maintained at a temperature of 10° C. under a pressure of 125 p.s.i. for 6 hours. The aqueous layer was then removed and the organosilicon layer distilled to give the following products.

| Product | Percent by weight based on the total organosilicon product |
|---|---|
| $EtMeSiCl_2$ | 6.6 |
| MeMe ClSiOSiCl EtEt | 32.1 |
| MeMe ClSi(OSi)_2Cl EtEt | 23.6 |
| MeMe ClSi(OSi)_3Cl EtEt | 20.6 |
| MeMe ClSi(OSi)_4Cl EtEt | 5.6 |
| Residue | 11.5 |

The residue contained all of the monoorgano impurities in the crude ethylmethyldichlorosilane.

Example 5

2 l. of a mixture of diethyldichlorosilane and ethyltrichlorosilane were hydrolyzed and the resulting siloxane copolymer was added to an equal volume of aqueous hydrochloric acid having a concentration of 56%. The HCl pressure in the reaction vessel before addition of the siloxane was 235 p.s.i. The mixture was agitated and maintained at a temperature of 18° C. throughout the reaction. Initially there was a pressure drop indicating interaction of the HCl with the siloxane. Additional HCl gas was added to bring the pressure to 265 p.s.i. Reaction was continued until the hydrolyzable chlorine content of the organosilicon phase became constant at 21.2% indicating an average degree of polymerization of 2.45. The aqueous phase was removed and the siloxane phase distilled to give the following products.

| Product | Percent by weight based on the total organosilicon product |
|---|---|
| $Et_2SiCl_2$ | 13.5 |
| $Et_2Et_2$ ClSiOSiCl | 37.1 |
| $Et_2Et_2$ ClSi(OSi)_2Cl | 35.6 |
| $Et_2Et_2$ ClSi(OSi)_3Cl | 4.4 |
| Residue | 9.4 |

Example 6

2 l. of $(MeHSiO)_5$ and 2 l. of 36% aqueous HCl were charged into a pressure kettle and gaseous HCl was added to bring the pressure to 260 p.s.i. The mixture was maintained at 18° C. and agitated for 44 hours. The final acid concentration was 55% in the aqueous phase and the final pressure was 270 p.s.i. indicating a slight amount of hydrogen cleavage. The aqueous phase was separated and the siloxane phase was distilled to give volatile methyl hydrogen chlorosiloxanes free of monomethylsilicon units and a nonvolatile residue.

Example 7

3620 ml. of dimethyldichlorosilane and 586 ml. of methyltrichlorosilane were dissolved in 2 l. of chloroform. This solution together with 1300 ml. of water were added to a pressure kettle. Gaseous HCl was introduced to bring the pressure to 235 p.s.i. at 24° C. This corresponds to an acid concentration of 54.3% in the aqueous phase. The mixture was agitated and after 20 hours the chloroform solution and the aqueous phase were separated and the organosilicon product was distilled to give the following products.

| Product | Percent by weight based on the total organosilicon product |
|---|---|
| $Me_2SiCl_2$ | 4.0 |
| $Me_2Me_2$ ClSiOSiCl | 18.3 |
| $Me_2Me_2$ ClSi(OSi)_2Cl | 13.3 |
| $Me_2Me_2$ ClSi(OSi)_3Cl | 5.2 |
| Residue | 60.2 |

Example 8

2 l. of crude chloromethylmethyldichlorosilane and 200 ml. of cyclohexane were added to 1500 ml. of 36% aqueous HCl in a pressure kettle. Gaseous HCl was added to bring the final pressure to 207 p.s.i. The mixture was agitated for 16 hours at 20° C. The aqueous layer was separated and the organosilicon layer was distilled to give volatile compounds of the formula

which were free of monoorganosiloxane impurities.

That which is claimed is:

1. A method comprising separating (1) silicon compounds having two and three substituents of the group consisting of alkyl and halogenated alkyl radicals of less than 6 carbon atoms and hydrogen atoms, per silicon atom, the remaining valences of the silicon being satisfied by atoms of the group consisting of chlorine and oxygen, and in (1) there being at least one organic radical per silicon, from each other and from (2) silicon compounds other than (1) by contacting mixtures and copolymers of said silicon compounds with an aqueous solution of hydrochloric acid having a concentration of at least 50% by weight HCl based on the weight of the aqueous solution until the hydrolyzable chlorine content of the organosilicon product has reached the desired amount, separating the aqueous phase from the organosilicon phase without appreciably reducing the concentration of the acid in the aqueous phase during separation and thereafter separating the organosilicon components of the reaction.

2. The method in accordance with claim 1 wherein all of the said substituents of silicon compound (1) are methyl radicals.

3. The method in accordance with claim 1 wherein all of the said substituents of silicon compound (1) are ethyl radicals.

4. The method in accordance with claim 1 wherein all of the said substituents of the silicon compound (1) are both ethyl and methyl radicals.

References Cited in the file of this patent

UNITED STATES PATENTS

| | | |
|---|---|---|
| 2,406,621 | Marsden | Aug. 27, 1946 |
| 2,673,843 | Humphrey et al. | Mar. 30, 1954 |
| 2,779,776 | Hyde et al. | Jan. 29, 1957 |

FOREIGN PATENTS

| | | |
|---|---|---|
| 752,860 | Great Britain | July 18, 1956 |

UNITED STATES PATENT OFFICE
CERTIFICATE OF CORRECTION

Patent No. 2,902,507                                    September 1, 1959

James F. Hyde et al

It is hereby certified that error appears in the printed specification of the above numbered patent requiring correction and that the said Letters Patent should read as corrected below.

Column 1, line 18, for "have devised" read -- have been devised --; line 47, for "ozygen" read -- oxygen --; column 5, Example 3, under the heading "Product" the fifth and sixth products should read as shown below instead of as in the patent:

A mixture of $(Me_2SiO)_4$ and
                        $Me_2\ Me_2$
                        $ClSi(OSi)_2Cl$ and A mixture of $(Me_2SiO)_x$ and
                        $Me_2\ Me_2$
                        $ClSi(OSi)_xCl$ Signed and sealed this 5th day of April 1960.

(SEAL)
Attest:

KARL H. AXLINE                                ROBERT C. WATSON
Attesting Officer                            Commissioner of Patents